US008949344B2

(12) United States Patent
Lawrence et al.

(10) Patent No.: US 8,949,344 B2
(45) Date of Patent: Feb. 3, 2015

(54) ASYNCHRONOUS QUEUED MESSAGING FOR WEB APPLICATIONS

(75) Inventors: Eric M. Lawrence, Redmond, WA (US); Sunava Dutta, Seattle, WA (US); Ganesh Ananthanarayanan, Berkeley, CA (US)

(73) Assignee: Microsoft Corporation, Redmond, WA (US)

( * ) Notice: Subject to any disclaimer, the term of this patent is extended or adjusted under 35 U.S.C. 154(b) by 120 days.

(21) Appl. No.: 12/210,225

(22) Filed: Sep. 15, 2008
(Under 37 CFR 1.47)

(65) Prior Publication Data
US 2010/0070586 A1    Mar. 18, 2010

(51) Int. Cl.
*G06F 15/16*    (2006.01)
*G06F 9/54*    (2006.01)
*H04L 29/08*    (2006.01)

(52) U.S. Cl.
CPC .............. *G06F 9/546* (2013.01); *H04L 67/306* (2013.01); *H04L 67/02* (2013.01)
USPC ........................................................ 709/206

(58) Field of Classification Search
CPC ............ H04L 2012/5681; H04L 49/90; H04L 49/3027; H04L 49/3018
USPC ......... 709/206–207, 224, 227, 234, 204–205; 370/408; 719/314, 311–312, 328–329; 715/736, 802, 804–805
See application file for complete search history.

(56) References Cited

U.S. PATENT DOCUMENTS

| 6,336,135 B1 | 1/2002 | Niblett et al. |
| 6,493,756 B1 | 12/2002 | O'Brien et al. |
| 6,658,485 B1 | 12/2003 | Baber et al. |
| 6,665,867 B1 | 12/2003 | Ims et al. |
| 7,003,570 B2 | 2/2006 | Messinger et al. |
| 7,702,739 B1 * | 4/2010 | Cheng et al. .................. 709/207 |

(Continued)

FOREIGN PATENT DOCUMENTS

| CN | 1503153 | 6/2004 |
| EP | 1715430 | 10/2006 |

(Continued)

OTHER PUBLICATIONS

"PCT Search Report and Written Opinion", Application No. PCT/US2009/056397, (Apr. 21, 2010),11 pages.

(Continued)

*Primary Examiner* — Chirag R Patel
(74) *Attorney, Agent, or Firm* — Bryan Webster; Kate Drakos; Micky Minhas

(57) ABSTRACT

Various embodiments enable local web applications to communicate asynchronously with web based services and applications based on a local device's current state and a user's communications preferences. In at least some embodiments, a synchronization engine receives a message in a "Web Inbox" from a web based service or application. In at least some embodiments, the synchronization engine notifies a local web application of the message, sends the message to the web application, and/or loads the web application if it is not in session. The web application's response to the message may be transferred to a "Web Outbox" where it resides until being sent to the web service. The synchronization engine then determines a time to transmit the response to the web service by querying the local device for its current state and a user's communication preferences.

20 Claims, 6 Drawing Sheets

(56) References Cited

U.S. PATENT DOCUMENTS

| | | | |
|---|---|---|---|
| 7,707,585 B2* | 4/2010 | Herrmann | 719/314 |
| 2003/0093576 A1* | 5/2003 | Dettinger et al. | 709/313 |
| 2005/0177825 A1 | 8/2005 | Kamalanathan | |
| 2005/0283461 A1* | 12/2005 | Sell et al. | 707/1 |
| 2006/0005142 A1* | 1/2006 | Karstens | 715/767 |
| 2006/0155810 A1* | 7/2006 | Butcher | 709/206 |
| 2006/0242246 A1* | 10/2006 | Lyle et al. | 709/206 |
| 2007/0005678 A1 | 1/2007 | Hughes et al. | |
| 2007/0171924 A1* | 7/2007 | Eisner et al. | 370/401 |
| 2007/0234195 A1* | 10/2007 | Wells | 715/501.1 |
| 2007/0249373 A1* | 10/2007 | Beard et al. | 455/466 |
| 2007/0282858 A1 | 12/2007 | Arner et al. | |
| 2008/0005657 A1 | 1/2008 | Sneh | |
| 2008/0162728 A1 | 7/2008 | Robeal et al. | |
| 2008/0209452 A1* | 8/2008 | Ebert et al. | 719/329 |
| 2009/0307715 A1* | 12/2009 | Santamaria et al. | 719/318 |

FOREIGN PATENT DOCUMENTS

| | | |
|---|---|---|
| EP | 1775911 | 4/2007 |
| GB | 2330503 | 4/1999 |
| JP | H0962637 | 3/1997 |
| JP | 2002543641 | 12/2002 |
| JP | 2004215279 | 7/2004 |
| TW | 386197 | 4/2000 |

OTHER PUBLICATIONS

Patton, "Using Message Queue Services in .NET", Retreived at <<http://www.builderau.com.au/program/dotnet/soa/Using-message-queue-services-in-NET/0,339028399,339274877,00.htm>>, Apr. 16, 2007, pp. 1-4.

"MS Message Queue Server Overview", Retreived at <<http://www.microsoft.com/technet/archive/winntas/proddocs/ntmsgqmn/msmqad00.mspx?mfr=true>>, Jun. 23, 2008, pp. 1-3.

Strawmyer, "Using Message Queues", Retreived at <<http://www.codeguru.com/columns/dotnet/article.php/c4241/>>, Jan. 12, 2004, pp. 1-6.

"Foreign Office Action", Chinese Application No. 200980136757.0, (Aug. 28, 2012), 11 pages.

"Foreign Office Action", Japanese Application No. 2011-526946, (Feb. 4, 2013), 10 pages.

"Foreign Office Action", Chinese Application No. 200980136757.0, (Mar. 6, 2013), 7 pages.

"Extended European Search Report", European Patent Application No. 09813555.1, (Mar. 25, 2013), 7 pages.

"Foreign Office Action", Japanese Application No. 2011-526946, (Aug. 9, 2013), 8 Pages.

"Foreign Office Action", JP Application No. 2011-526946, Mar. 14, 2014, 9 Pages.

"Foreign Office Action", AR Application No. P090103542, Aug. 4, 2014, 10 Pages.

"Foreign Office Action", TW Application No. 098129437, Aug. 28, 2014, 17 pages.

"Foreign Notice of Allowance", JP Application No. 2011-526946, Aug. 14, 2014, 4 pages.

"Foreign Office Action", EP Application No. 09813555.1, Nov. 5, 2014, 6 Pages.

* cited by examiner

ASYNCHRONOUS QUEUED MESSAGING FOR WEB APPLICATIONS

BACKGROUND

Generally, software applications are programs that perform various tasks and functions such as word processing, playing digital media, video gaming, accounting, and the like.

While software applications typically reside on local computing devices (e.g., personal computers, personal digital assistants, cell phones, etc.), there is a growing trend to move software applications off local devices and into a web environment. There are many reasons for doing this including that web based software applications generally have access to a greater variety and quantity of content, and web based software applications are generally more interactive.

However, there are also practical issues with moving software applications to the web. First, web based software applications generally use an Internet connection to operate or communicate with a local device. For example, a user wishing to E-mail a friend or family member typically establishes an Internet connection, accesses a web application (e.g., Hotmail™, Gmail™, and the like), and sends the message. If the Internet connection is lost while the message is being written or sent, the message is typically lost as well.

Moreover, once an Internet connection is established, the connection maybe inadequate (e.g., slow connection) or suboptimal (e.g., connection degrades or changes over time). For example, during a typical business trip, a sales person may have broadband Internet at their office, a cellular based Internet connection while traveling to meet with a customer, and a WiFi connection at a restaurant or hotel. Each of these Internet connections offers a different level of functionality and bandwidth.

Finally, to provide the same convenience and functionality as current local software applications, current web programming models generally utilize complex layers of code.

SUMMARY

This Summary is provided to introduce a selection of concepts in a simplified form that are described below in the Detailed Description. This Summary is not intended to identify key or essential features of the claimed subject matter, nor is it intended to limit the scope of the claimed subject matter.

Various embodiments enable web browsers and/or local applications to communicate asynchronously with web based services and applications based on a local device's current state and a user's communication preferences.

BRIEF DESCRIPTION OF THE DRAWINGS

The same numbers are used throughout the drawings to reference like features.

DETAILED DESCRIPTION

Overview

Various embodiments enable web browsers and local applications to communicate asynchronously with web based services and applications based on a local device's current state and a user's communication preferences.

In at least some embodiments, a synchronization engine residing on a local device receives a message in a "web inbox" from a web based service or application. In at least some implementations, the synchronization engine notifies a local web application of the message, sends the message to the web application, and/or loads the web application if it is not currently in session. The web application's response to the message may be transferred to a "web outbox" where it resides until sent to the web service or application. The synchronization engine then determines a desirable time to transmit a response to the web service by querying the local device for its current state and a user's communication preferences. The synchronization engine may then determine a time to communicate with the web service and transmit the response.

Alternately or additionally, the synchronization engine may receive a message from a web application that is intended for a local application at a "local outbox". In at least some implementations, the synchronization engine notifies the local application of the message, sends the message to the local application, and/or loads the local application if it is not currently in session. The local application may respond to the message by requesting information from the web application or by making other similar requests. The response is transferred to a "local inbox" where it may reside until sent to a web based service or application. The synchronization engine may then determine a time to transmit the response to the web service or application by querying the local device's operating system for its current state and a user's communications preferences. The synchronization engine may then determine a desirable time to communicate with the web service or application and transmit the response.

In the discussion that follows, a section entitled "Operating Environment" describes a computing environment in which the various embodiments can be employed. Following this, a section entitled "Asynchronous Web Communications" describes an embodiment in which a synchronization engine asynchronously communicates with various web based services and applications. Next, a section entitled "Asynchronous Local Communications" describes a computing environment in which a synchronization engine asynchronously communicates with various web and local applications. Lastly, a section entitled "Example System" describes an example system that can be used to implement one or more embodiments.

Operating Environment

Figure 1:
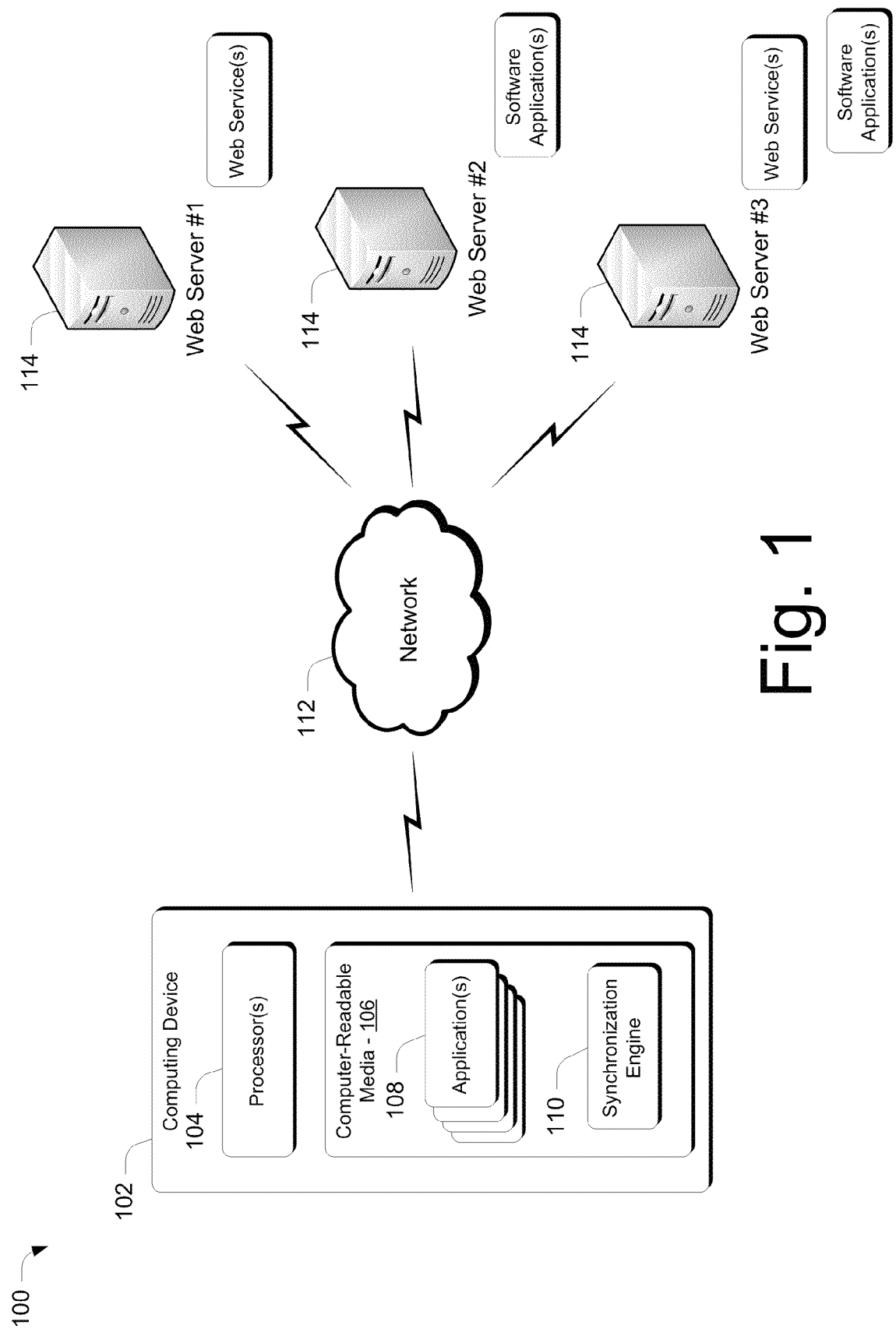
FIG. 1 illustrates an operating environment in which the inventive principles can be employed in accordance with one or more embodiments.

FIG. 1 illustrates an operating environment 100 in accordance with one or more embodiments. Environment 100 includes a computing device 102 having one or more processors 104, one or more computer-readable media 106, one or more applications 108 that reside on the computer-readable media 106 and which are executable by the processor 104, and a synchronization engine 110 to asynchronously communicate with various web based services and applications.

Computing device 102 can be embodied as any suitable computing device such as, by way of example and not limitation, a desktop computer, a portable computer, a personal digital assistant (PDA), a cell phone, and the like.

Computer-readable media 106 can include, by way of example and not limitation, all forms of volatile and non-volatile memory and/or storage media that are typically associated with a computing device. Such media can include read only memory (ROM), random access memory (RAM), flash memory, hard disk, removable media and the like. One specific example of a computing device is shown and described in FIG. 6.

The software applications 108 can include any suitable type of application such as, by way of example and not limitation, reader applications, E-mail applications, instant messaging applications, Web browsing applications, and a variety of other applications.

In one or more embodiments, the synchronization engine 110 is a software application that enables the computing device 102 to asynchronously communicate with various web services and applications over a network 112, such as the Internet. The network 112 could be any type of computing network including a local area network (LAN) that typically connects a business or residence, or a wide area network (WAN) such as the Internet.

The operating environment 100 also includes assorted web servers 114 which represent web sites that provide various web services such as news and current events, E-mail services, on-line banking, social networking, and the like. In a further embodiment, the web sites provide web based applications such as reader applications, E-mail applications, instant messaging applications, and the like, that perform various tasks or functions.

Having considered an example operating environment 100, the discussion now shifts to an embodiment in which the synchronization engine 110 can be used to asynchronously communicate with various web services and applications.

Asynchronous Web Communications

In one or more embodiments, a synchronization engine enables a local computing device to asynchronously communicate with various web servers and local applications residing on a local device, such as computing device 102. The synchronization engine assesses the current network environment, state of the local device, and a user's communication preferences to determine a desired time for the local computing device to communicate with the web servers and local applications.

Figure 2:
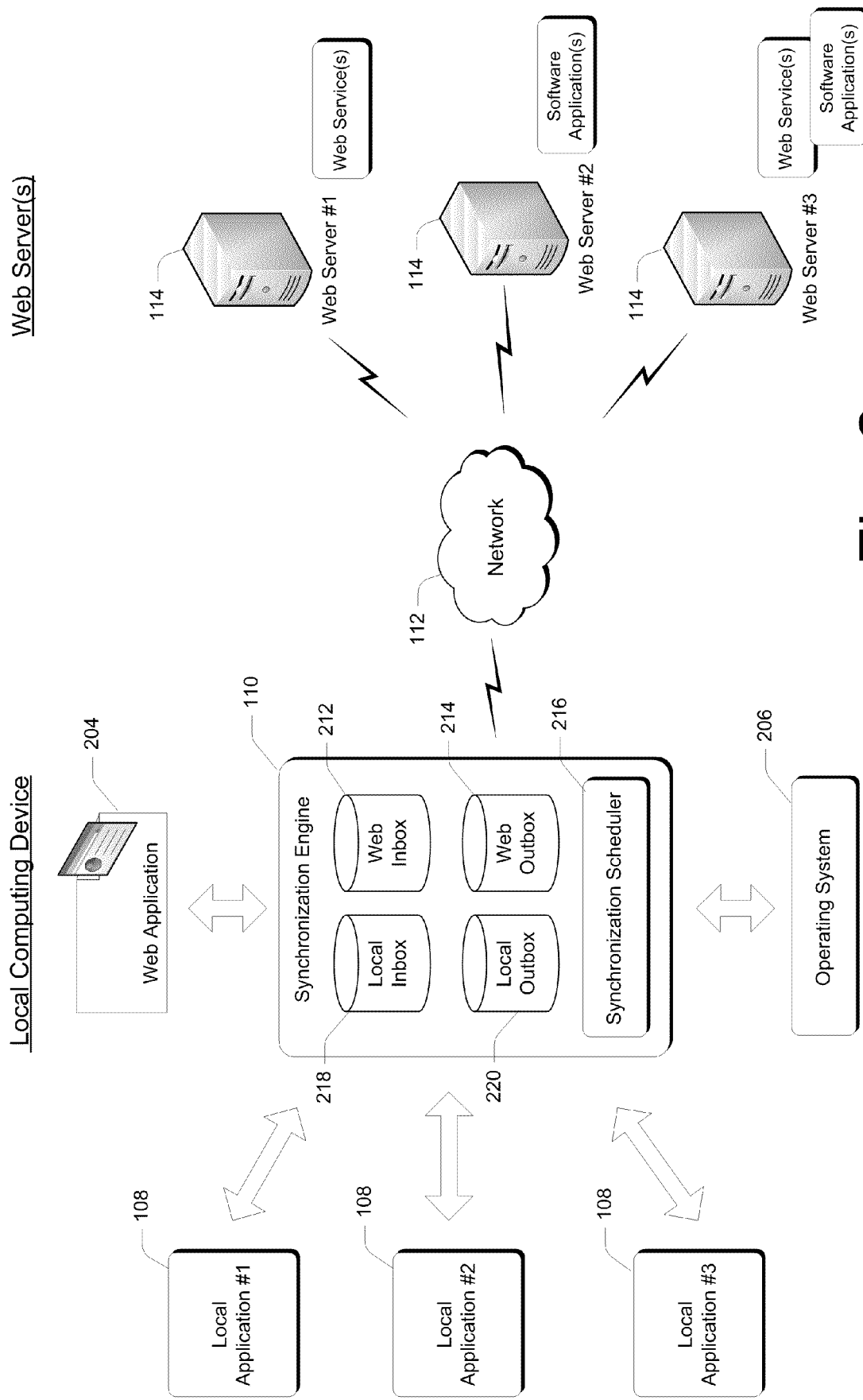
FIG. 2 illustrates a local computing device with a synchronization engine, a network, and various web servers in accordance with one or more embodiments.

FIG. 2 illustrates a local computing device with a synchronization engine 110, assorted software applications 108, a web application 204, and an operating system 206.

In general, the web application 204 allows a user to browse the computer network 112 and communicate with various web servers 114. The web servers 114, in turn, provide the user with various web services (e.g., news and current events, E-mail services, on-line banking, social networking, and the like), and software applications (e.g., reader applications, media player applications, instant messaging applications, and the like).

In general, the operating system 206 manages the computing device's hardware and software resources, and provides a software platform on which the various local applications 108 operate. The operating system 206 manages the local devices hardware and software resources to ensure that each application has access to the resources needed to perform its assigned tasks.

Lastly, the synchronization engine 110 is a software application residing in computer memory and enables asynchronous communication with and between various web servers 114 and local applications 108. Specifically, in the illustrated example, the synchronization engine 110 includes web inboxes 212 and outboxes 214 for communicating with the various web servers 114, local inboxes 218 and outboxes 220 for communicating with the various local applications 108, and a synchronization scheduler 216 for determining a desired time to communicate with the web servers 114 and local applications 108.

In one or more embodiments, the web inbox 212 serves as a repository for data and messages sent to or received by the computing device 102, while the web outbox 214 serves as a repository for messages being sent or transmitted by the computing device. In general, the web inbox 212 and outbox 214 enable the local device to asynchronously communicate with the various web servers 114 based on a local device's current state and/or a user's communication preferences.

Local inbox 218 and outbox 220 serve as repositories for messages being transmitted between the web application 204 and/or the various local applications 108. In general, these boxes can be used when a local application 108 wishes to communicate with a web server 114, but the web application 204 is not in session, or when the web application 204 is communicating with the web server 114, but the local application 108 is not in session. In general, messages are archived in the local outbox 220 when being sent to the local applications 108, and archived in the local inbox 218 when being sent to the web application 204.

Generally, the web inbox 212, web outbox 214, local inbox 218, and local outbox 220 reside in non-volatile memory, such as flash memory, hard drive, optical media, and the like.

Figure 3:
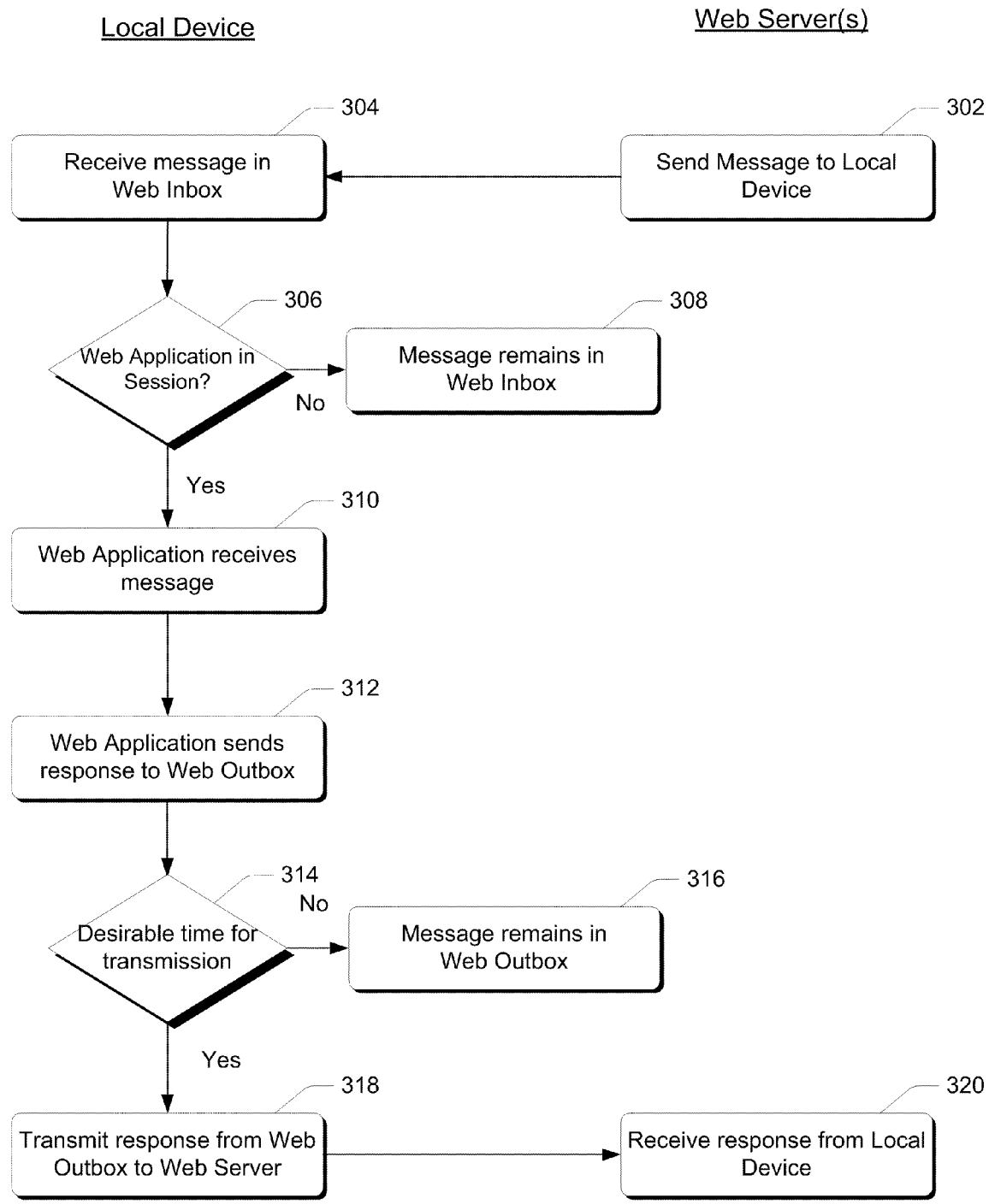
FIG. 3 is a flow diagram describing steps in a method of asynchronously communicating with a web server in accordance with one or more embodiments.

FIG. 3 is a flow diagram describing steps in a method in accordance with one or more embodiments. The method can be performed in connection with any suitable hardware, software, firmware, or combination thereof. In at least some embodiments, the method can be performed by a software application such as the synchronization engine 110 described in FIG. 2.

At step 302, a web service or an application residing on a web server sends a message to a local computing device. This step can be initiated by a web application navigating a webpage, the user requesting a web service or software download, or any other method of initiating a communication through a web server. The message can be any type of message and can include, by way of example and not limitation, HTML code associated with a webpage, a software download, or any other suitable form of message.

At step 304, the local device receives the message from the web server. The message could be received at a web inbox, such as web inbox 212, or transferred to the web inbox from a separate receiving location. The message is stored in the web inbox until a web application executed by the local device retrieves the message, or the message is sent to the web application.

At step 306, a synchronization engine, such as synchronization engine 210, determines whether the web application is in session by querying the local device's operating system 206. This can be done, for example, by making an API call into the operating system. If the web application is not in session, the message may remain in the web inbox, at step 308, until the web application is loaded and the message is accessed. In a further embodiment, the synchronization engine may instruct the operating system to load the web application so that it may access the message.

At step 310, the web application receives the message from the web server. The message may include HTML code associated with a webpage, a software download, or any other form of data. Alternatively, the synchronization engine may transfer the message to the web application or notify the web application of the message.

At step 312, the web application replies to the message by sending a "response" to the web outbox. The response could be a request for web page data, a request to perform a software download, or a request to send/receive other types of data.

At step 314, the synchronization scheduler determines a desirable time to transmit the response to the web server(s) 114. In general, the synchronization scheduler determines a time to transmit the response to the web server(s) based on information it acquires from the operating system. There are several factors or parameters the synchronization scheduler 216 (FIG. 2) may consider when determining when to communicate with the web server(s) 114. By way of example, and not limitation, these factors may include a type of network connection, a current processor usage, the message's priority or urgency as assigned or established by a user or application, as well as other factors or parameters.

First, the synchronization scheduler may query the operating system to determine if a network connection has been established or is being established. If a network connection is not established, the message may remain in the web outbox until a connection is established. In an alternate embodiment, the synchronization scheduler may direct the operating system to establish a network connection to transmit the message.

If a network connection has been established, the synchronization scheduler may query the operating system to obtain a number of factors or parameters regarding the network connection. These may include, for example, the type of network connection (e.g., DSL, WiFi, cellular broadband, dial-up, etc.), transmission rate (e.g., bits/second), the stability of the network connection (e.g., number of network dropouts in the past hour), and the like. From this information the synchronization scheduler may determine whether the current network connection can efficiently and reliably transmit the response.

The synchronization scheduler may then query the operating system to determine various processor parameters, such as for example the number of applications currently running, the processor's current work load, and the like. From this information the synchronization scheduler may determine if the processor is able to transmit the response while performing its current tasks.

The synchronization scheduler may then query the operating system to determine a priority for the message or response. In one example, a message's priority is established by one or more "user communication preferences" that have been instituted or inputted by a user. A user's communication preferences may include a message's importance, a message's urgency, a message's size, a message's content, a recipient of the message, and the like. In an alternate embodiment, a message's priority is established by querying the user directly in real time.

Finally, the synchronization scheduler compiles the various parameters and determines whether to transmit the message/response or wait for a better or more opportunistic time.

Once the synchronization scheduler has determined a desirable time to transmit the message/response, the synchronization engine can either wait for a better time and the message remains in the Web outbox, at step 316, or transmits the message/response to the web server(s), at step 318.

At step 320, the web server(s) receives the message/response and performs the requested function (e.g., responds with the requested HTML code, provides the requested software download, stores the submitted data, etc.).

Having described example embodiments in which a synchronization engine enables a local computing device to communicate asynchronously with various web servers, consider now an embodiment in which a local application, such as application 108 (FIG. 2) communicates asynchronously with a local web application. Specifically, in the embodiment described below the synchronization engine determines whether the web application or local applications are in service and establishes a desirable time to communicate asynchronously with various web server(s).

Asynchronous Local Communications

Figure 4:
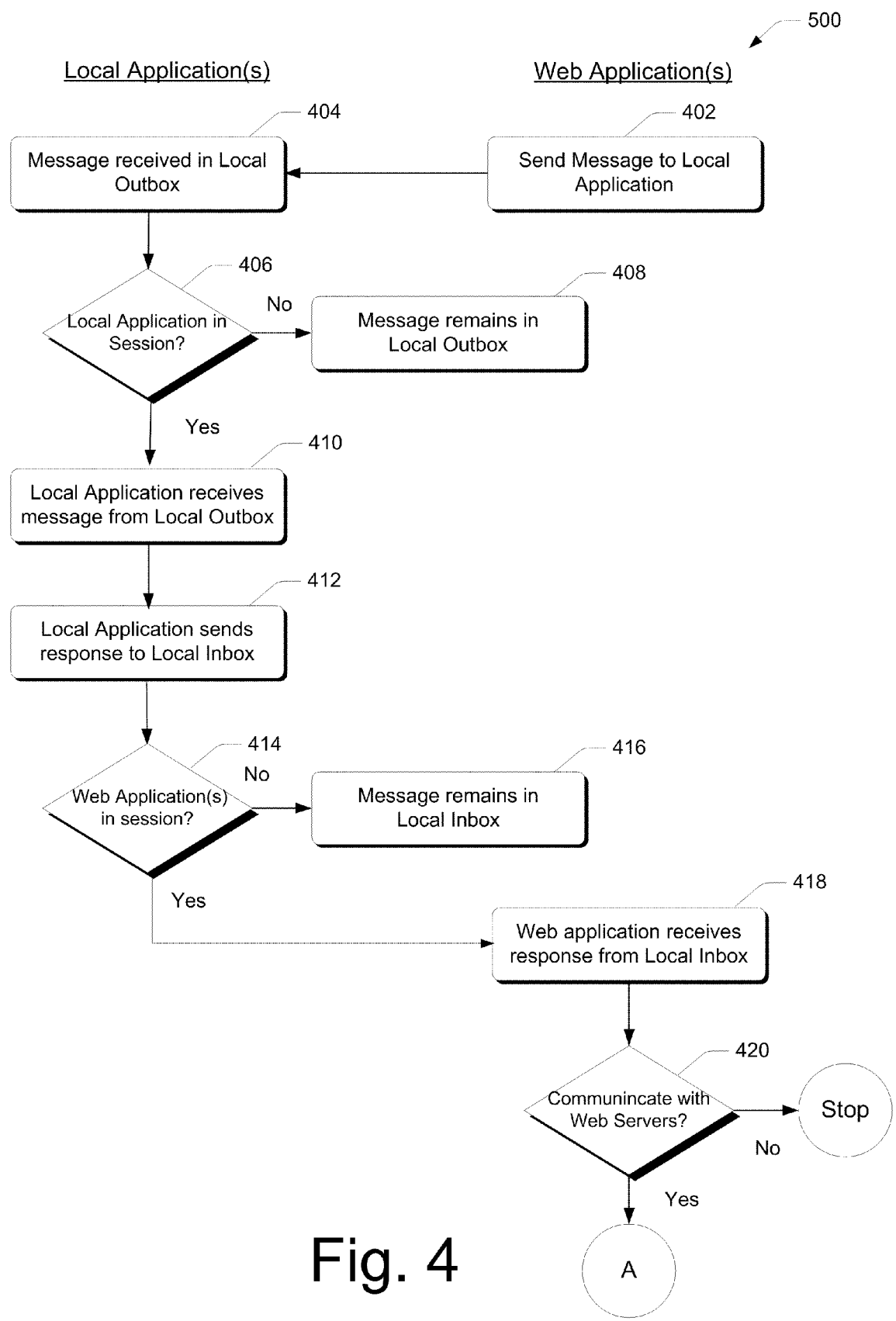
FIGS. 4 and 5 are flow diagrams describing steps in a method of asynchronously communicating with a local software application in accordance with one or more embodiments.

FIG. 4 is a flow diagram describing steps in a method of communicating asynchronously with a local software application(s) in accordance with one or more embodiments. In at least some embodiments, the method can be performed using a synchronization engine, such as synchronization engine 110 described in FIG. 2.

At step 402, a web application, such as web application 204 (FIG. 2), sends a message to one or more local application(s) residing on a local computing device. For example, the message could include a new device driver or link thereto, a software update, or other data of interest.

At step 404, the message is received in the local outbox, such as local outbox 220 of FIG. 2, or transferred to the local outbox from a separate receiving location. The message is retained in the local outbox until the local application retrieves the message or is sent the message.

At step 406, the synchronization engine determines whether the desired local application is in session by querying the operating system. If the local application is not in session, the message may remain in the local outbox, at step 408, until the local application is loaded and the message accessed. In a further embodiment, the synchronization engine may direct the operating system to load the local application so that it may access the message.

At step 410, the local application receives the message from the local outbox. Alternatively, the synchronization engine may transfer the message to the local application or notify the local application of the message.

At step 412, the local application may reply to the message by sending a response to the local inbox, such as local inbox 218 of FIG. 2. The response could be a request to download web page data, download software, update data within the web application, receive digital content, and the like.

At step 414, the synchronization engine determines whether the web application is in session by querying the operating system. If the web application is not in session, the response may remain in the local inbox until the web application is loaded and the message accessed, at step 416. In a further embodiment, the synchronization engine may instruct the operating system to load the web application so that it may access the message.

At step 418, the web application receives the response directing it to perform a task or function. For example, the task or function may cause the web application to communicate with various web servers to access a web page, download a software update, or download digital content.

At step 420, the web application may determine whether it can establish communications with the various web servers in order to perform the requested task. If the task can be performed without accessing the web servers, the web application executes the task and the process is completed (Stop). Alternatively, if the task cannot be performed without accessing the web servers, the web application establishes a network connection and communicates with one or more web server(s) (Step A).

Figure 5:
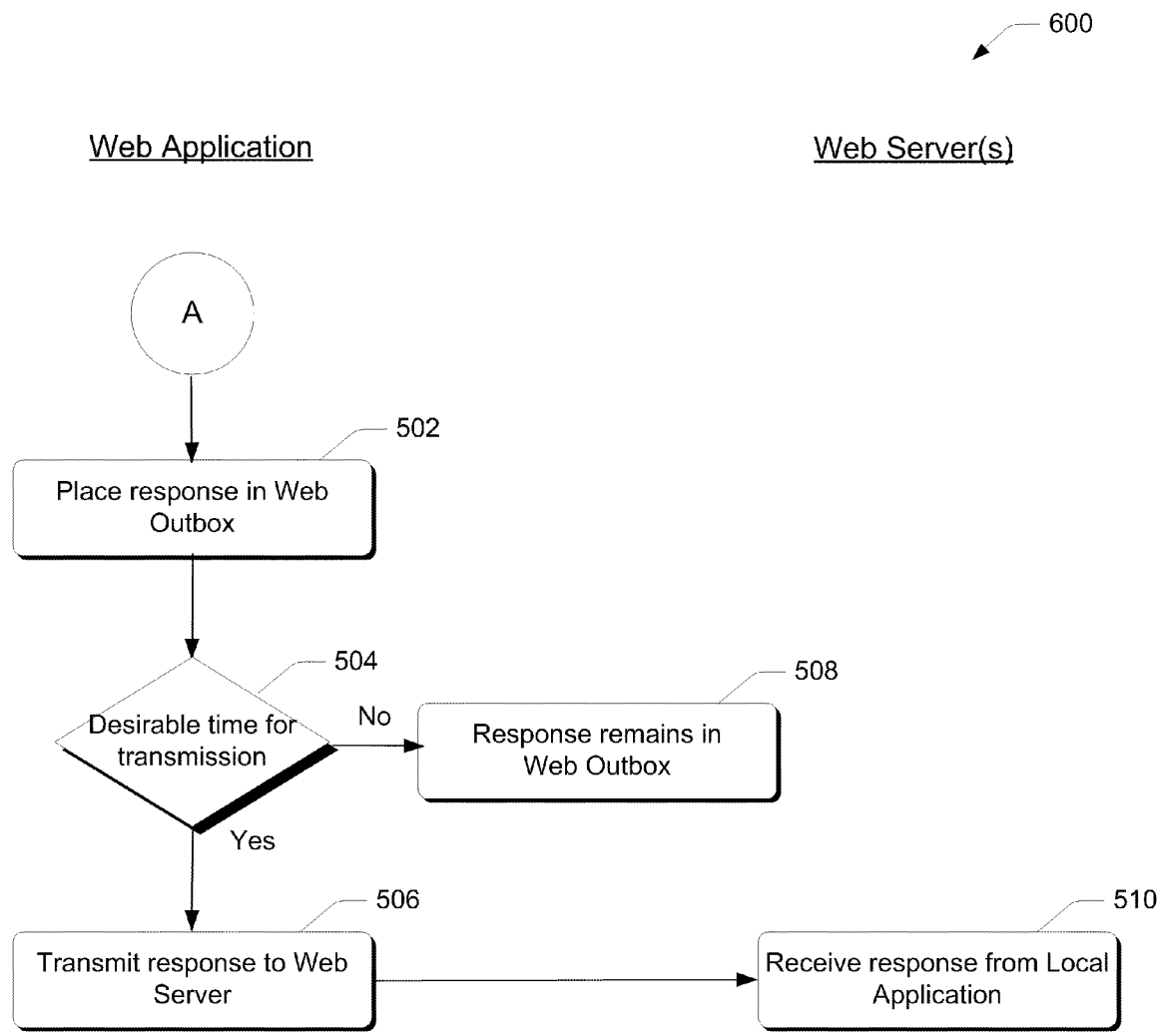

FIG. 5 is a flow diagram describing how the web application may communicate asynchronously with one or more web server(s).

At step 502, the local application's response is placed in a web outbox, such as web outbox 214 of FIG. 2, in preparation for being transmitted to the one or more web server(s). At step 504, the synchronization scheduler determines a desirable time to transmit the response based on information it acquires from the operating system, such as for example, a type of network connection, a current processor usage, a user's communications preferences, and the like.

Once the synchronization scheduler has determined when to transmit the message/response, the synchronization engine either transmits the message/response to the web server at step 506, or retains the response in the web outbox and waits for a better time, at step 508.

At step 510, the web server(s) receives the message/response and performs the requested task or function (e.g., responds with HTML code, provides a requested software download, etc.).

Having described various embodiments in which a synchronization engine enables a local computing device to asynchronously communicate with various web servers and local applications, consider now a discussion of an example computing device that can be utilized to implement the embodiments described above.

Example System

Figure 6:
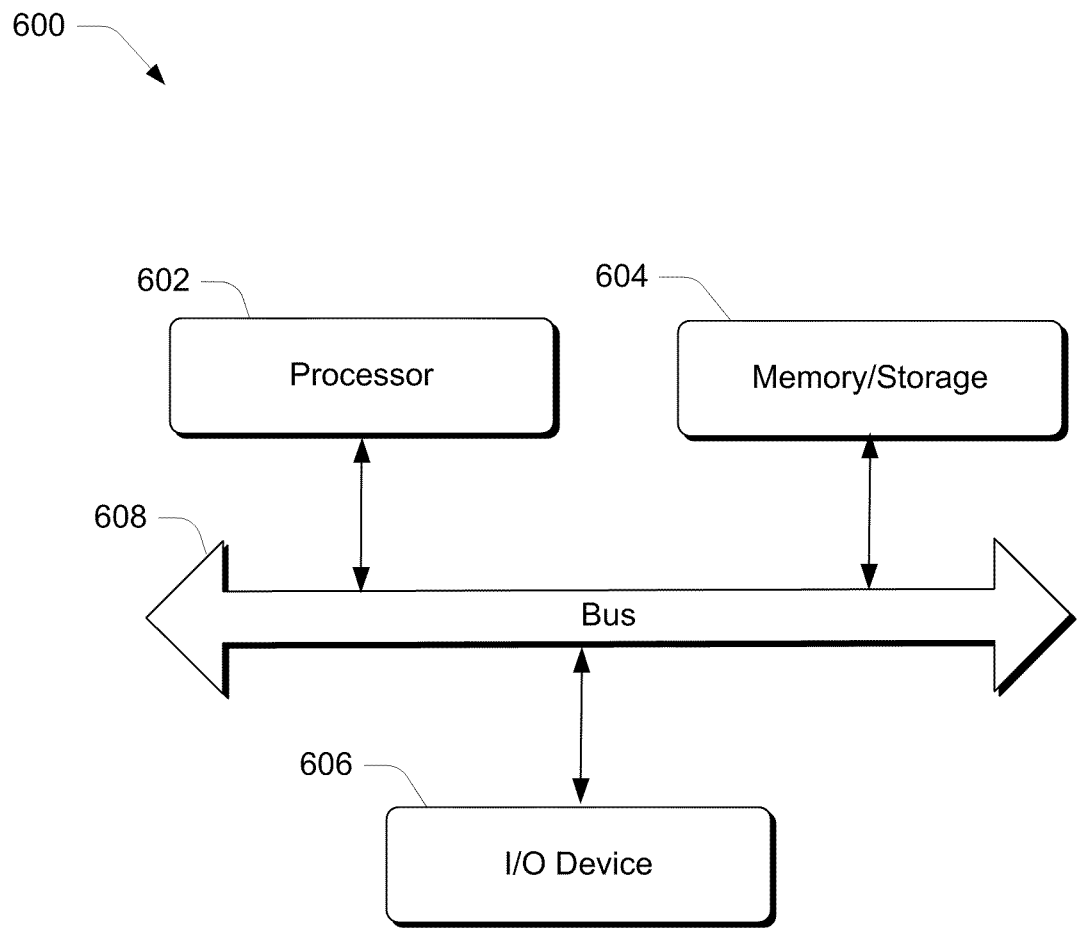
FIG. 6 is a block diagram of a system in accordance with one or more embodiments.

FIG. 6 illustrates an example computing device 600 that can implement the various embodiments described above. Computing device 600 can be, for example, computing device 102 of FIG. 1 or any other suitable computing device such as a web server and the like.

Computing device 600 includes one or more processors 602, one or more memory and/or storage components 604, one or more input/output (I/O) devices 606, and a bus 608 that allows the various components and devices to communicate with one another.

Bus 608 represents several types of bus structures including a memory bus or memory controller, a peripheral bus, an accelerated graphics port, or a local bus employing a variety of bus architectures.

Memory/storage component 604 represents one or more computer storage devices or storage media. The memory component 604 can include volatile media, such as random access memory (RAM), and/or nonvolatile media, such as read only memory (ROM), Flash memory, optical media, magnetic media, and the like. The storage component 604 can also include fixed media (e.g., RAM, ROM, a fixed hard drive, etc.) as well as removable media (e.g., a Flash memory drive, a removable hard drive, an optical disk, and so forth).

One or more input/output devices 606 enable a user to enter commands and information into the computing device 600, and allows information to be presented to the user and/or other components or devices. For example, the input devices may include a keyboard, a pointing device (e.g., a mouse, touch pad, stylus, etc.), a microphone, and a scanner, and so forth. The output devices may include a display device (e.g., a monitor or projector), speakers, a printer, and a network card, to name a few.

Various techniques may be described herein in the context of software or program modules. Generally, software includes applications, routines, programs, objects, components, data structures, and so forth that perform tasks or implement abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

Conclusion

Various embodiments enable web browsers and local applications to communicate asynchronously with web based services and/or applications based on a local device's current state and a user's communications preferences.

Asynchronous communication enables web browsers and local applications to communicate with web based applications irrespective of whether an Internet connection is currently established or when the Internet connection is inadequate or suboptimal.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A method of asynchronously communicating with a web application, comprising:

receiving one or more messages from one or more web applications residing on a local device at a first box that facilitates communication for the local device between the one or more web applications and one or more local applications that also reside on the local device and that are intended recipients of the one or more messages from the one or more web applications;

determining whether the one or more local applications are in session and whether to load the one or more local applications responsive to determining that the one or more local applications are not in session, wherein the determining is performed to ascertain a message-related action to be performed;

responsive to performing the message-related action, receiving one or more responses to the one or more messages from one or more local applications residing on the local device at a second box of the local device, wherein the first and second boxes facilitate communication for the local device of the one or more responses to one or more web services when the one or more web applications are not in session;

transferring the one or more responses from the second box to a third box of the local device for transmission to the one or more web services, wherein the transferring to the third box is performed through the one or more web applications when those applications are in session;

determining a time to transmit the one or more responses to the one or more web services; and transmitting the one or more responses from the third box to the one or more web services at a determined time.

2. A method as recited in claim 1, wherein the one or more web applications comprise a web browser application.

3. A method as recited in claim 1, wherein the time is determined based on at least one of a network connection, a processor usage, or a user's communication preferences.

4. A method as recited in claim 3, wherein the network connection is evaluated based on at least one of a type of network connection, a transmission rate, or a stability of the network connection.

5. A method as recited in claim 1, further comprising: responsive to determining the one or more local applications are in session, performing the message-related action, wherein the message-related action comprises transferring the one or more messages from the first box to the one or more local applications.

6. A method as recited in claim 1, further comprising: responsive to determining the one or more local applications are in session, performing the message-related action, wherein the message-related action comprises notifying the one or more local applications of the one or more messages in the first box.

7. A method as recited in claim 1, further comprising: responsive to determining the one or more local applications are not in session, performing the message-related action, wherein the message-related action comprises loading the one or more local applications.

8. A system for asynchronously communicating with a web application and embodied in a computing device, the system comprising:
   at least one processor;
   computer-readable storage media having stored thereon multiple instructions that, when executed by the at least one processor, perform operations comprising:
      receiving one or more messages from one or more web applications residing on a local device at a first box that facilitates communication for the local device between the one or more web applications and one or more local applications that also reside on the local device and that are intended recipients of the one or more messages from the one or more web applications;
      determining whether the one or more local applications are in session and whether to load the one or more local applications responsive to determining that the one or more local applications are not in session, wherein the determining is performed to ascertain a message-related action to be performed;
      responsive to performing the message-related action, receiving one or more responses to the one or more messages from one or more local applications residing on the local device at a second box of the local device, wherein the first and second boxes facilitate communication for the local device of the one or more responses to one or more web services when the one or more web applications are not in session;
      transferring the one or more responses from the second box to a third box of the local device for transmission to the one or more web services, wherein the transferring to the third box is performed through the one or more web applications when those applications are in session;
      determining a time to transmit the one or more responses to the one or more web services; and
      transmitting the one or more responses from the third box to the one or more web services at a determined time.

9. A system as recited in claim 8, wherein the one or more web applications comprise a web browser application.

10. A system as recited in claim 8, wherein the time is determined based on at least one of a network connection, a processor usage, or a user's communication preferences.

11. A system as recited in claim 10, wherein the network connection is evaluated based on at least one of a type of network connection, a transmission rate, or a stability of the network connection.

12. A system as recited in claim 8, wherein the operations further comprise: responsive to determining the one or more local applications are in session, performing the message-related action, wherein the message-related action comprises transferring the one or more messages from the first box to the one or more local applications.

13. A system as recited in claim 8, wherein the operations further comprise: responsive to determining the one or more local applications are in session, performing the message-related action, wherein the message-related action comprises notifying the one or more local applications of the one or more messages in the first box.

14. A system as recited in claim 8, wherein the operations further comprise: responsive to determining the one or more local applications are not in session, performing the message-related action, wherein the message-related action comprises loading the one or more local applications.

15. One or more computer-readable hardware storage device having instructions stored thereon that are executable by a computing device to perform operations comprising:
   receiving one or more messages from one or more web applications residing on a local device at a first box that facilitates communication for the local device between the one or more web applications and one or more local applications that also reside on the local device and that are intended recipients of the one or more messages from the one or more web applications;
   determining whether the one or more local applications are in session and whether to load the one or more local applications responsive to determining that the one or more local applications are not in session, wherein the determining is performed to ascertain a message-related action to be performed;
   responsive to performing the message-related action, receiving one or more responses to the one or more messages from one or more local applications residing on the local device at a second box of the local device, wherein the first and second boxes facilitate communication for the local device of the one or more responses to one or more web services when the one or more web applications are not in session;
   transferring the one or more responses from the second box to a third box of the local device for transmission to the one or more web services, wherein the transferring to the third box is performed through the one or more web applications when those applications are in session;
   determining a time to transmit the one or more responses to the one or more web services, and
   transmitting the one or more responses from the third box to the one or more web services at a determined time.

16. One or more computer-readable hardware storage device as recited in claim 15, wherein the time is determined based on at least one of a network connection, a processor usage, or a user's communication preferences.

17. One or more computer-readable hardware storage device as recited in claim 16, wherein the network connection is evaluated based on at least one of a type of network connection, a transmission rate, or a stability of the network connection.

18. One or more computer-readable hardware storage device as recited in claim 15, wherein the operations further comprise: responsive to determining the one or more local applications are in session, performing the message-related action, wherein the message-related action comprises transferring the one or more messages from the first box to the one or more local applications.

19. One or more computer-readable hardware storage device as recited in claim 15, wherein the operations further comprise: responsive to determining the one or more local applications are in session, performing the message-related action, wherein the message-related action comprises notifying the one or more local applications of the one or more messages in the first box.

20. One or more computer-readable hardware storage device as recited in claim 15, wherein the operation further comprise: responsive to determining the one or more local applications are not in session, performing the message-related action, wherein the message related action comprises loading the one or more local applications.

* * * * *